US012644477B2

(12) United States Patent
Bhaskar et al.

(10) Patent No.: US 12,644,477 B2
(45) Date of Patent: Jun. 2, 2026

(54) ACTUATOR

(71) Applicant: The Boeing Company, Chicago, IL (US)

(72) Inventors: Bhuvan Bhaskar, Bangalore (IN); Jagdish L. Shinde, Bangalore (IN); Vinay Sreedhar, Bangalore (IN); Prashantha K. Ana, Bengaluru (IN); Kiritharan Gurusamy, Bangalore (IN)

(73) Assignee: THE BOEING COMPANY, Arlington, VA (US)

( * ) Notice: Subject to any disclaimer, the term of this patent is extended or adjusted under 35 U.S.C. 154(b) by 190 days.

(21) Appl. No.: 17/501,481

(22) Filed: Oct. 14, 2021

(65) Prior Publication Data

US 2022/0205466 A1 Jun. 30, 2022

Related U.S. Application Data

(60) Provisional application No. 63/115,852, filed on Nov. 19, 2020.

(51) Int. Cl.
*F15B 15/26* (2006.01)

(52) U.S. Cl.
CPC .................................. *F15B 15/261* (2013.01)

(58) Field of Classification Search
CPC ............................... F15B 15/26; F15B 15/261
See application file for complete search history.

(56) References Cited

U.S. PATENT DOCUMENTS 3,107,933 A 10/1963 Royster
3,228,307 A * 1/1966 Dillard .................. F15B 15/261 92/26
3,813,065 A * 5/1974 Hallesy ................. F15B 15/261 92/25
5,379,969 A * 1/1995 Marx ........................ B64C 3/56 92/23
2014/0102291 A1 4/2014 Maurer et al.

FOREIGN PATENT DOCUMENTS

CH 353428 A 4/1961
CN 205779994 U * 12/2016
CN 210660835 U 6/2020
DE 102004063362 A1 7/2006
(Continued)

OTHER PUBLICATIONS

English language machine translation of EP 1647722 from PE2ESearch (Year: 2024).*
(Continued)

*Primary Examiner* — Michael Quandt
(74) *Attorney, Agent, or Firm* — COATS & BENNETT, PLLC

(57) ABSTRACT

The present disclosure relates to a mechanical actuator having a modified locking mechanism and fewer components. The actuator has a cylinder, a locking recess formed on an interior wall of the cylinder, and a piston assembly that moves between an extended position and a retracted position responsive to fluid pressure within the cylinder. A lock is connected to the piston assembly and moves radially between a locked position and an unlocked position responsive to the fluid pressure within the cylinder.

20 Claims, 9 Drawing Sheets

(56) References Cited

FOREIGN PATENT DOCUMENTS

| | | | | | |
|---|---|---|---|---|---|
| DE | 102007048907 | A1 | | 4/2009 | |
| EP | 1647722 | A1 | * | 4/2006 | ............ F15B 15/261 |
| FR | 1189523 | A | | 10/1959 | |
| GB | 458005 | A | | 10/1936 | |
| GB | 493471 | A | * | 10/1938 | ............ B64C 25/22 |
| GB | 861546 | A | | 2/1961 | |
| JP | S5183973 | A | | 7/1976 | |
| JP | S60118008 | U | | 8/1985 | |

OTHER PUBLICATIONS

English language machine translation of CN 205779994 from PE2ESearch (Year: 2024).*

JP Office Action issued Sep. 30, 2025 in re JP Application No. 2021-187637.

CN Office Action mailed Mar. 19, 2026 in re CN Application No. 202111374758.8.

* cited by examiner

ACTUATOR

RELATED APPLICATIONS

The present application claims benefit of U.S. Provisional Application 63/115,852, which was filed Nov. 19, 2020, the disclosures of which is incorporated herein by reference in their entirety.

TECHNICAL FIELD

The present disclosure relates generally to aircraft flight control systems, and more particularly to actuators configured to control a flight control member of an aircraft.

BACKGROUND

Aircraft include one or more movable flight control members allowing pilots and/or on-board systems to adjust and control the attitude of the aircraft during flight. Some typical flight control members found on aircraft include, but are not limited to, ailerons on the wings for roll control, elevators on the horizontal tail of the empennage for pitch control, a rudder on the vertical tail of the empennage for yaw control, as well as various other movable control surfaces.

The movement of flight control members is typically effected by one or more actuators mechanically coupled between a base on the aircraft (e.g., a wing spar) and the flight control member. Generally, such actuators operate hydraulically and are a supplier designed part. However, because of their complex design and large number of different parts, the manufacture and servicing of conventional actuators is not very economical. Particularly, conventional actuator designs call for a large number of different parts manufactured from a variety of different metals and metal alloys. Not only does this make conventional actuators more expensive and complex to manufacture and maintain, but it also causes long waiting periods for servicing and increased turnaround time. There is a desire to address these issues associated with conventional actuators for flight control members.

BRIEF SUMMARY

Aspects of the present disclosure relate to a mechanical actuator having an improved locking mechanism and fewer components. Because of these aspects, actuators configured according to the present disclosure are less complex than conventional actuators, and cheaper to manufacture and maintain. Further, the waiting periods related to servicing such actuators are decreased, as is the turnaround time, thereby helping to address issues associated with conventional actuators.

Accordingly, in one aspect of the present disclosure, an actuator for a flight control member comprises a cylinder, one or more locking recesses formed on an interior wall of the cylinder, a piston assembly disposed within the cylinder and configured to move between a retracted position and an extended position responsive to fluid pressure within the cylinder, and a locking mechanism connected to the piston assembly. The locking mechanism comprises one or more locks. Each lock is configured to move radially between a locked position in which the lock engages a corresponding locking recess, and an unlocked position in which the lock disengages the corresponding locking recess, responsive to the fluid pressure within the cylinder. A biasing member for each lock is configured to radially bias the lock into the locked position when the fluid pressure within the cylinder is less than a predetermined fluid pressure.

In one aspect, the actuator further comprises an extension port through which the fluid enters the cylinder to move the one or more locks radially to the unlocked position, and a retraction port through which the fluid enters the cylinder to move the piston assembly to the retracted position.

In one aspect, each of the one or more locks move radially to the unlocked position when the fluid pressure at the extension port is not less than the predetermined fluid pressure. Further, each of the one or more locks is biased radially to the locked position when the fluid pressure at the extension port is less than the predetermined fluid pressure.

In one aspect, the piston assembly comprises a piston head and a piston rod connected to the piston head.

In one aspect, the piston head is a monolithic member and comprises a piston body section, a piston cap section, a support section positioned axially between the piston body section and the piston cap section, and one or more cavities formed between the piston cap section and the piston body section.

In one aspect, the one or more locks move radially within the one or more cavities between the locked and unlocked positions.

In one aspect, each biasing member is disposed within a corresponding cavity between the support section and a corresponding lock of the one or more locks.

In one aspect, the actuator further comprises a castle nut threadably engaged with the cylinder proximate one end of the actuator. The castle nut comprises a central bore configured to receive the piston rod therethrough.

In one aspect, the castle nut is a monolithic member and further comprises a scraper assembly and a scraper configured to contact the piston rod as the piston rod moves within the central bore.

In one aspect, the castle nut further comprises one or more channels formed thereon, with each channel sized to receive a corresponding gasket.

In one aspect, the castle nut further comprises a first gasket seated in a first channel and configured to form a seal between an interior wall of the castle nut and the piston rod, and a second gasket seated in a second channel and configured to form a seal between an exterior wall of the castle nut and an interior wall of the cylinder.

In another aspect, of the present disclosure, a method of operating an actuator for a flight control member is provided. In this aspect, the method calls for moving a piston assembly disposed within a cylinder of the actuator between a retracted position and an extended position responsive to fluid pressure within the cylinder, moving one or more locks connected to the piston assembly radially between a locked position in which each of the one or more locks engages a corresponding locking recess formed on an interior wall of the cylinder, and an unlocked position in which each of the one or more locks disengages the corresponding locking recess, responsive to the fluid pressure within the cylinder, and radially biasing the lock into the locked position when the fluid pressure within the cylinder is less than a predetermined fluid pressure.

In one aspect, radially moving the one or more locks between the locked position and the unlocked position comprises supplying the cylinder with hydraulic fluid via an extension port such that when the fluid pressure at the extension port reaches the predetermined fluid pressure, the one or more locks move radially to the unlocked position.

In one aspect, each of the one or more locks moves radially within a cavity formed on an interior of a piston head of the piston assembly between the locked position and the unlocked position.

In one aspect, each of the one or more locks are radially biased within the cavity towards the corresponding locking recess formed on the interior wall of the cylinder.

In one aspect, the method further comprises threadably engaging the cylinder with a monolithic castle nut proximate one end of the actuator.

In one aspect, the method further comprises the monolithic castle nut scraping a piston rod connected to the piston head as the piston rod moves through a central bore formed in the monolithic castle nut.

In another aspect of the present disclosure, a vehicle comprises one or more actuators. In this aspect, each actuator comprises a cylinder, one or more locking recesses formed on an interior wall of the cylinder, a piston assembly disposed within the cylinder, and configured to move between a retracted position and an extended position responsive to fluid pressure within the cylinder, and a locking mechanism connected to the piston assembly. The locking mechanism comprises one or more locks, each lock configured to move radially between a locked position in which the lock engages a corresponding locking recess, and an unlocked position in which the lock disengages the corresponding locking recess, responsive to the fluid pressure within the cylinder, and a biasing member for each lock. The biasing member is configured to radially bias the lock into the locked position when the fluid pressure within the cylinder is less than a predetermined fluid pressure.

In one aspect, the actuator further comprises an extension port through which the fluid enters the cylinder to move the one or more locks radially to the unlocked position, and a retraction port through which the fluid enters the cylinder to move the piston assembly to the retracted position.

In one aspect, the vehicle is an aircraft. In these aspects, at least one of the one or more actuators is disposed on a flight control member of the aircraft.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure relate to a mechanical actuator having an improved locking mechanism and fewer components, compared to conventional actuators. Particularly, in one aspect, an actuator configured according to the present disclosure has a cylinder, a locking recess formed on an interior wall of the cylinder, and a piston assembly that moves between an extended position and a retracted position responsive to fluid pressure within the cylinder. A lock is connected to the piston assembly and moves radially between a locked position and an unlocked position responsive to the fluid pressure within the cylinder. In the locked position, a biasing member radially biases the lock towards the locking recess such that the lock engages the locking recess. So engaged, the lock prevents movement of the piston assembly within the cylinder. In the unlocked position, the lock disengages from the locking recess, thereby allowing the piston assembly to move within the cylinder.

Actuators configured according to the present disclosure create or contribute to a system that provides significant benefits over conventional actuators by reducing the number of component parts used to build such actuators. Particularly, fewer component parts reduce the complexity of the actuators, thereby resulting in a significant cost savings in the manufacture and maintenance of the actuators. Additionally, fewer component parts reduce the weight of a vehicle that utilizes the actuators. This means that the cost to operate the vehicle is also positively affected.

Figure 1:
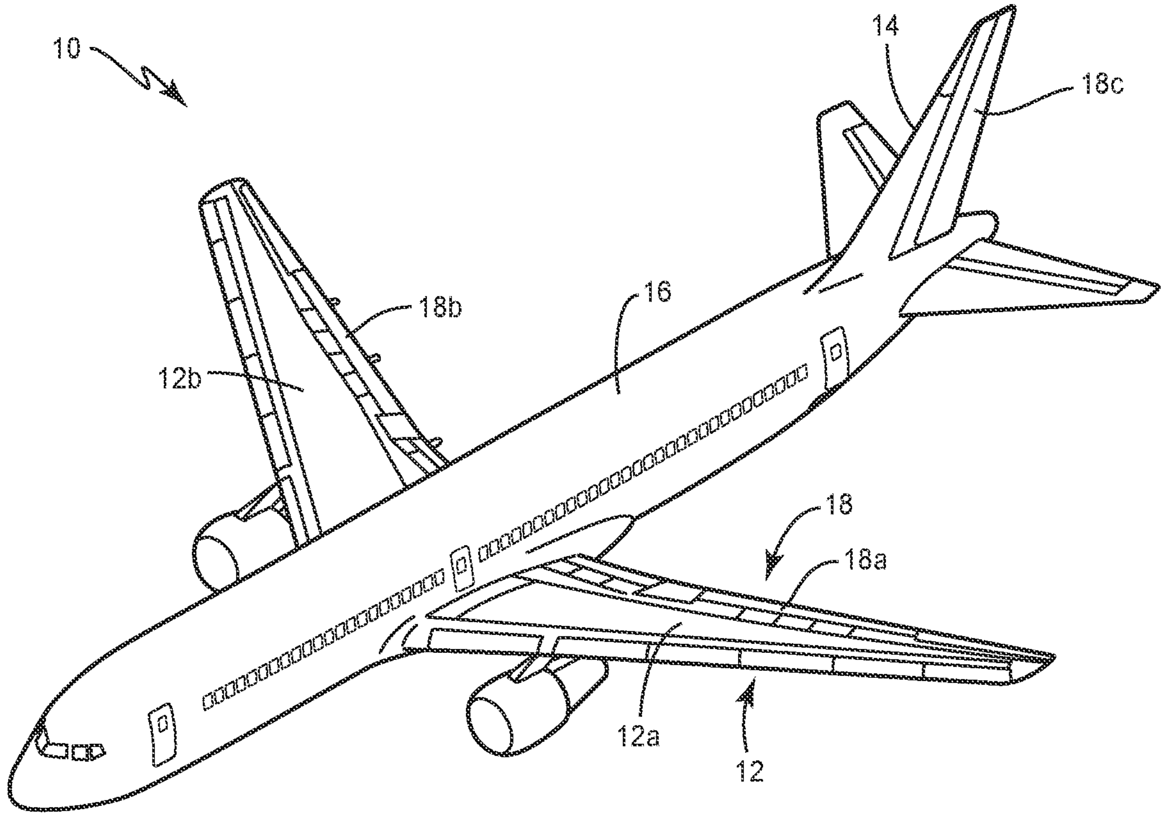
FIG. 1 is a perspective view of a vehicle configured with an actuator according to one aspect of the present disclosure.

Turning now to the drawings, FIG. 1 illustrates an aircraft 10 configured with one or more actuators according to one aspect of the present disclosure. As seen in FIG. 1, aircraft 10 comprises a pair of wing members 12*a*, 12*b* (collectively, wings 12) and a tail section 14 connected to a fuselage 16. A plurality of different types of flight control members 18*a*, 18*b*, 18*c* (collectively, flight control members 18) are distributed on aircraft 10. By way of non-limiting example, the flight control members 18 can be disposed on wings 12 or the tail section 14, and can include but are not limited to a rudder, elevators, ailerons, wing leading and trailing edge devices, and spoilers. According to aspects of the present disclosure, the flight control members 18 are movably attached to aircraft 10. During flight, pilots and/or control systems on board aircraft 10 change the orientation of the flight control members 18 using actuators configured according to the present disclosure to adjust and control the attitude of the aircraft.

Figure 2:
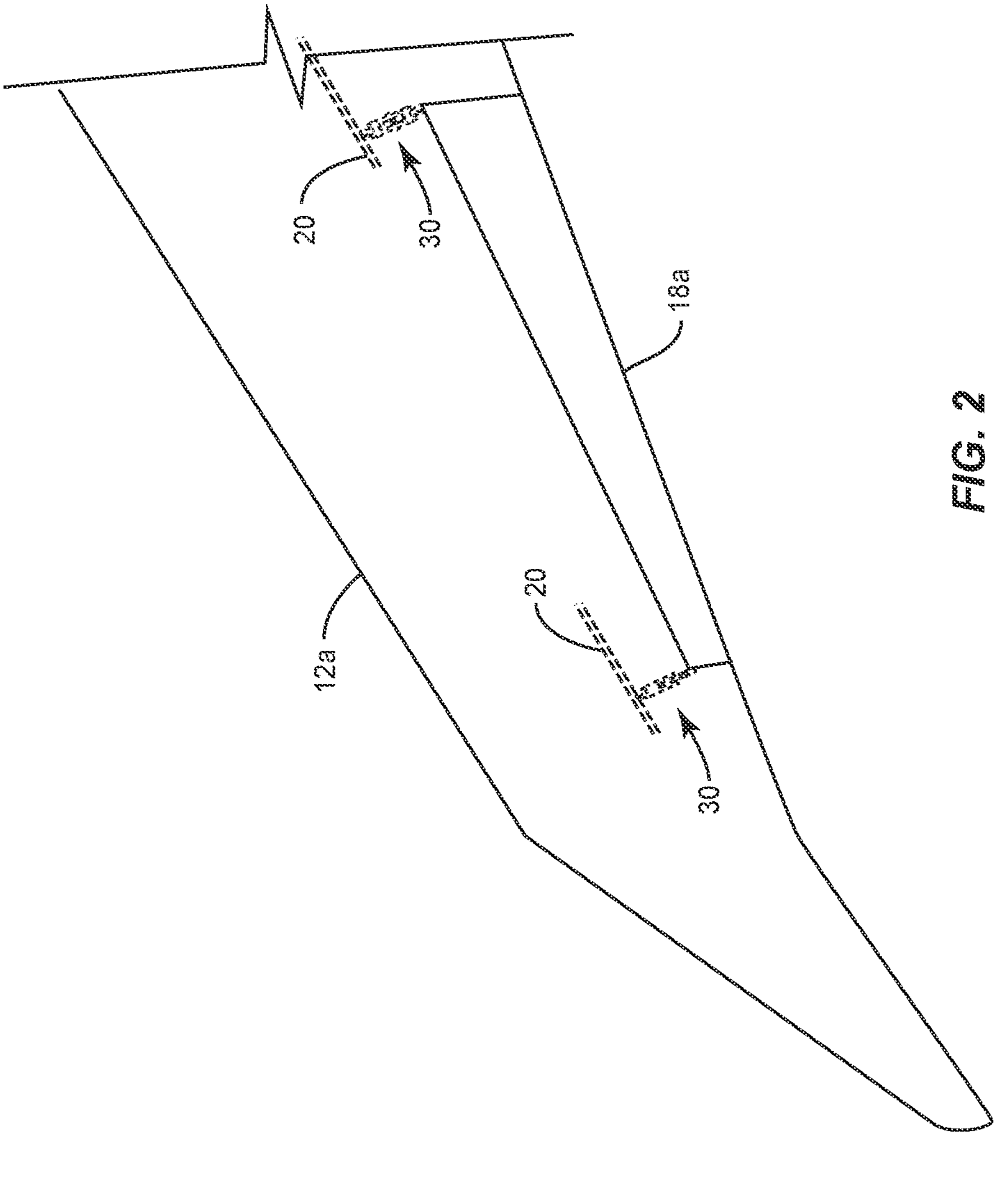
FIG. 2 is a perspective view of an actuator configured according to one aspect of the present disclosure installed on a wing of an aircraft.

FIG. 2 is a top view of wing 12*a* illustrating possible placements on aircraft 10 for one or more actuators 30 configured to control movement of a flight control member 18*a* according to one aspect of the present disclosure. As will be readily appreciated by those of ordinary skill in the art, the particular positioning of the actuators 30 on wing 12*a* is for illustrative purposes only. Indeed, in other aspects, the actuators 30 may be disposed on parts of aircraft 10 other than wing 12*a*, such as on wing 12*b* and/or tail section 14, for example, as well as in other positions and orientations. Regardless of the particular placement and orientation, however, actuators 30 are disposed between a support structure

20 of aircraft 10 and flight control member 18*a* such that actuators 30 control the movement of the flight control member 18*a*.

Figure 3A:
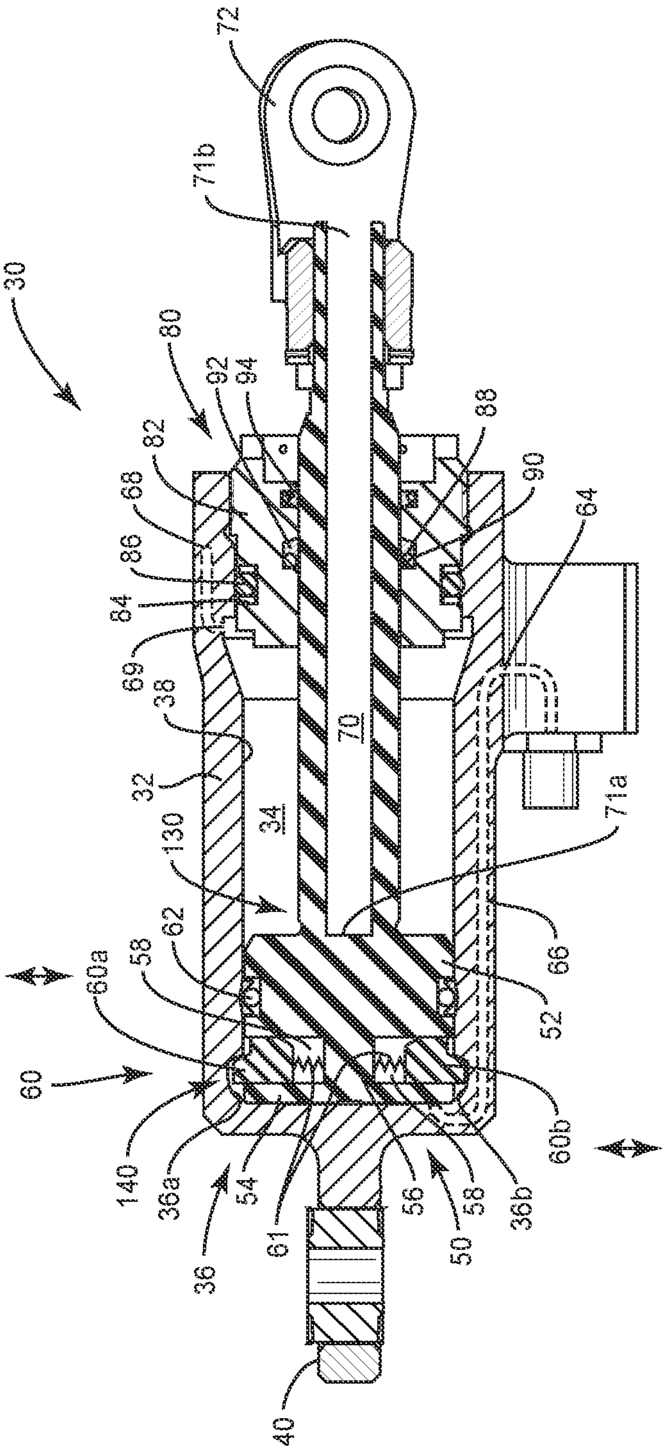
FIG. 3A is a cut-away view illustrating an actuator in a retracted position according to one aspect of the present disclosure.
Figure 3B:
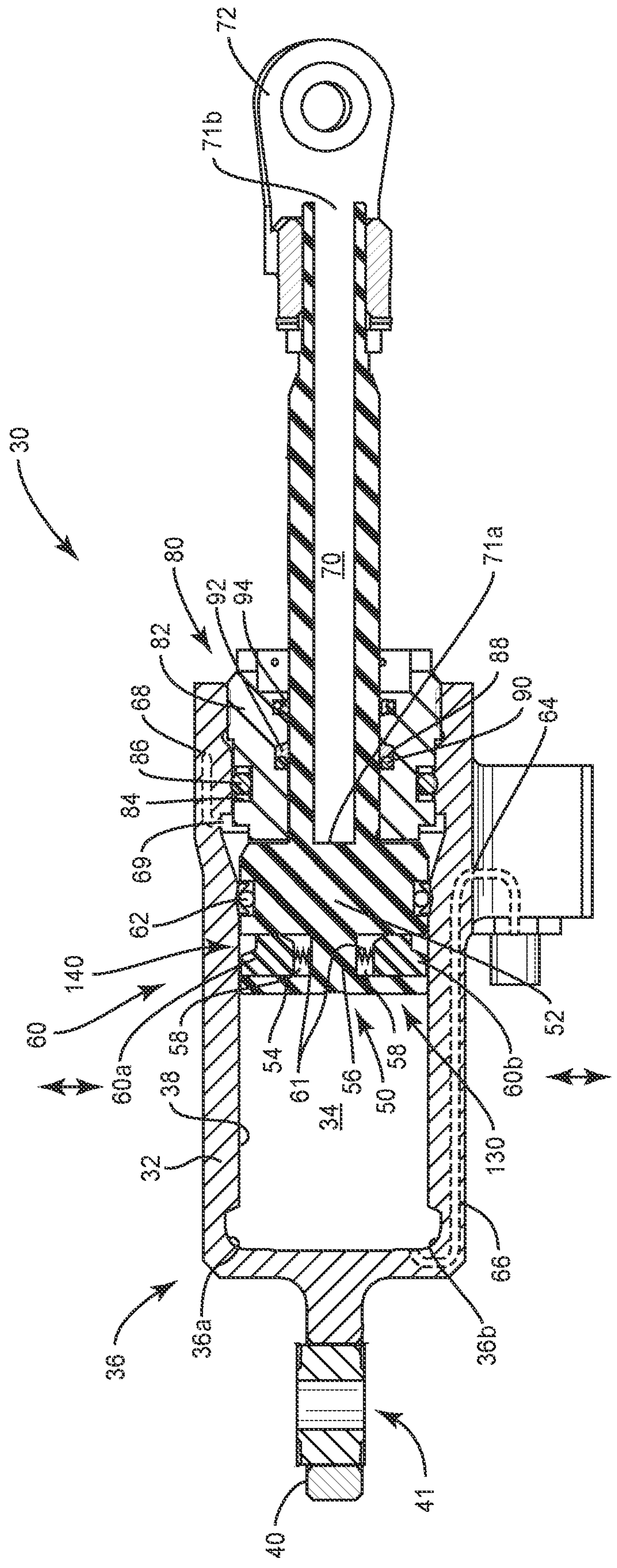
FIG. 3B is a cut-away view illustrating an actuator in an extended position according to one aspect of the present disclosure.
Figure 3D:
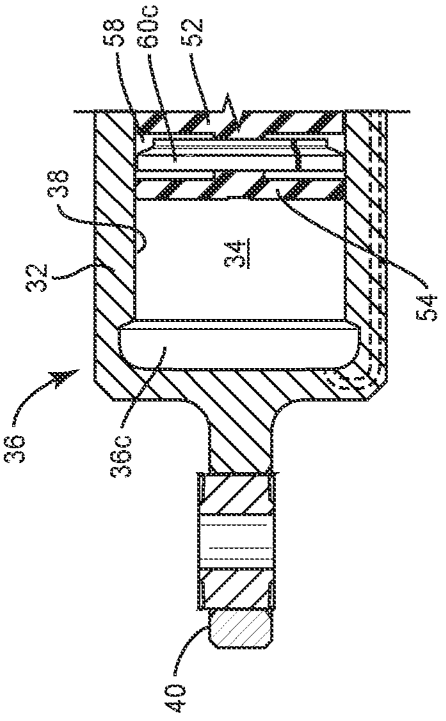
FIGS. 3C-3D are cut-away views illustrating a locking mechanism configured according to aspects of the present disclosure.
Figure 3C:
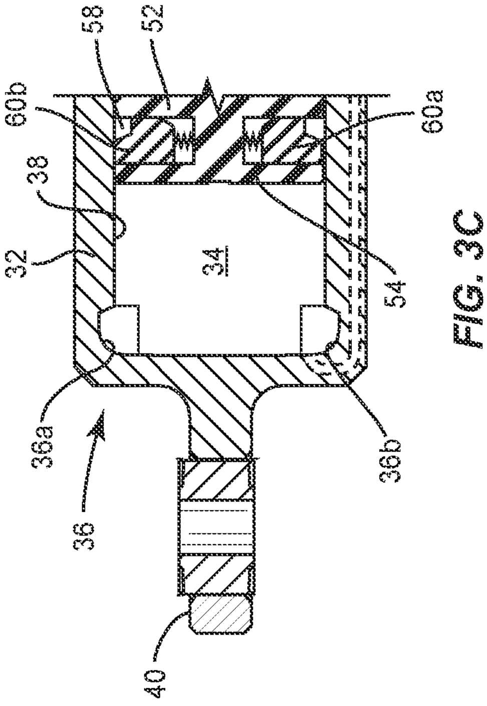

FIGS. 3A-3D are cut-away views of an actuator 30 configured according to one aspect of the present disclosure. In particular, FIG. 3A illustrates actuator 30 in a retracted position and FIG. 3B illustrates actuator 30 in an extended position. FIGS. 3C-3D are close-up views of actuator 30 illustrating an internal structure of actuator 30 according to the present aspects.

As seen in FIGS. 3A-3D, an actuator 30 configured according to aspects of the present disclosure comprises a cylinder 32 having an internal chamber 34. One or more locking recesses 36*a*, 36*b*, 36*c* (collectively, locking recesses 36) are formed on an interior wall 38 of cylinder 32. In one aspect (FIG. 3C), actuator 30 comprises a plurality of locking recesses 36*a*, 36*b* formed on the interior wall 38. In this aspect, each locking recess 36*a*, 36*b* is formed independently and is spaced-apart from the other locking recess 36*a*, 36*b*. In another aspect, however (FIG. 3D), actuator 30 comprises a single locking recess 36*c* formed on the interior wall 38 of cylinder 32 as an annular channel or race. Regardless of the particular structure of the locking recesses 36, however, a piston assembly 130 is disposed within cylinder 32, and is configured to move between the retracted position seen in FIG. 3A and the extended position seen in FIG. 3B responsive to fluid pressure in chamber 34. One end 41 of the actuator 30 comprises a first connecting member 40 configured to fixedly attach actuator 30 to a support structure 20 on aircraft 10.

The piston assembly 130 comprises a piston head 50 and a piston rod 70. One end 71*a* of piston rod 70 is connected to piston head 50. The opposite end 71*b* of piston rod 70 has a second connecting member (e.g., connection member 72) configured to attach to a flight control member 18 on aircraft 10. As the piston assembly 130 moves between the extended and retracted positions, the connection member 72 moves the flight control member 18 accordingly In this aspect of the present disclosure, piston head 50 is a monolithic member comprising a piston body section 52, a piston cap section 54, and a support section 56 positioned axially between the piston body section 52 and the piston cap section 54. The piston head 50 also comprises a locking mechanism 140 that includes one or more locks 60*a*, 60*b*, 60*c* (collectively, locks 60), a biasing member 61 for each lock 60, one or more cavities 58, and a gasket 62 disposed between the piston body section 52 and the interior wall 38 of cylinder 32. As seen in FIGS. 3C-3D, the number and structure of locks 60, and of the one or more cavities 58, may depend on the number and structure of locking recesses 36. In one aspect, when actuator 30 is formed to include a plurality of locking recesses 36*a*, 36*b*, actuator 30 comprises a plurality of corresponding locks 60*a*, 60*b*—one lock for each cavity and locking recess (FIG. 3C). In another aspect, however, actuator 30 comprises a single lock 60*c* (FIG. 3D). In these aspects, the single lock 60*c* has a "slit" cut into it that allows the lock 60*c* to be squeezed when not engaged with the locking recess 36*c*. So formed, lock 60*c* fits within cavity 58 formed in the piston cap section 54, and is configured to slide into and out of locking recess 36*c* formed as a channel or race on interior wall 38 of cylinder 32.

In at least one aspect, gasket 62 is a rubber gasket (e.g., an O-ring). In operation, gasket 62 forms a seal between the piston body section 52 and the interior wall 38 of cylinder 32 that prevents hydraulic fluid from flowing between the piston body section 52 and the interior wall 38 of cylinder 32.

Each lock 60 is configured to move radially within a corresponding cavity 58 formed within piston head 50 between a locked position (FIG. 3A) and an unlocked position (FIG. 3B). In the locked position, each lock 60 engages a corresponding locking recess 36*a*, 36*b*, and prevents the axial movement of piston assembly 130 between the retracted position and the extended position. In the unlocked position, each lock 60 disengages from its respective locking recess 36 such that piston assembly 130 moves freely from the retracted position to the extended position.

According to the present disclosure, the radial movement of the locks 60 from the locked position to the unlocked position is responsive to the fluid pressure within chamber 34. To accomplish this, one aspect of cylinder 32 comprises a first conduit 66 connected to an extension port 64 and a second conduit 68 connected to a retraction port 69. When the piston assembly 130 is in the locked position, hydraulic fluid is pumped into cylinder 32 via extension port 64 and enters chamber 34 at or near the piston cap section 54. When the fluid pressure within cylinder 32 and at extension port 64, reaches a predetermined amount (i.e., greater than the biasing force of the biasing members 61), locks 60 disengage locking recesses 36 and move radially towards support section 56. At the same time, hydraulic fluid that is already in chamber 34 is pumped out of cylinder 32 via retraction port 69. Once the locks 60 are fully disengaged from the locking recesses 36, the increasing fluid pressure on piston cap section 54 moves piston assembly 130 towards the extended position.

To move the piston assembly from the extended position to the retracted position, the hydraulic fluid that already exists in chamber 34 is pumped out of cylinder 32 via the extension port 64, while hydraulic fluid is pumped into chamber 34 via retraction port 69. Thus, the pressure of the hydraulic fluid entering chamber 34 via the retraction port 69 (i.e., the pressure of the fluid pressing on the piston body section 52) increases, while the pressure of the hydraulic fluid exiting chamber 34 via extension port 64 (i.e., the pressure of the fluid pressing on the piston cap section 54) decreases. The changes in fluid pressure within chamber 34 move the piston assembly 130 axially from the extended position to the retracted position. Further, because the hydraulic fluid exerts a decreasing amount of fluid pressure on locks 60, the biasing members 61 radially bias the locks 60 back into engagement with the locking recesses 36.

In addition to the piston head 50, actuator 30 is also configured to include a monolithic castle nut 80. As seen in the figures, monolithic castle nut 80 is configured to threadably engage the interior wall 38 of cylinder 32 proximate one end of actuator 30 and comprises a body 82 having an interior wall 82*a* and an exterior wall 82*b*, a first channel 84 formed on the exterior wall 82*b* of the castle nut 80, a second channel 88 formed on the interior wall 82*a* of the castle nut 80, first and second gaskets 86, 90 (e.g., O-rings) sized to fit within corresponding first and second channels 84, 88, respectively, an end gland scraper 92, and a scraper assembly 94.

Figure 4B:
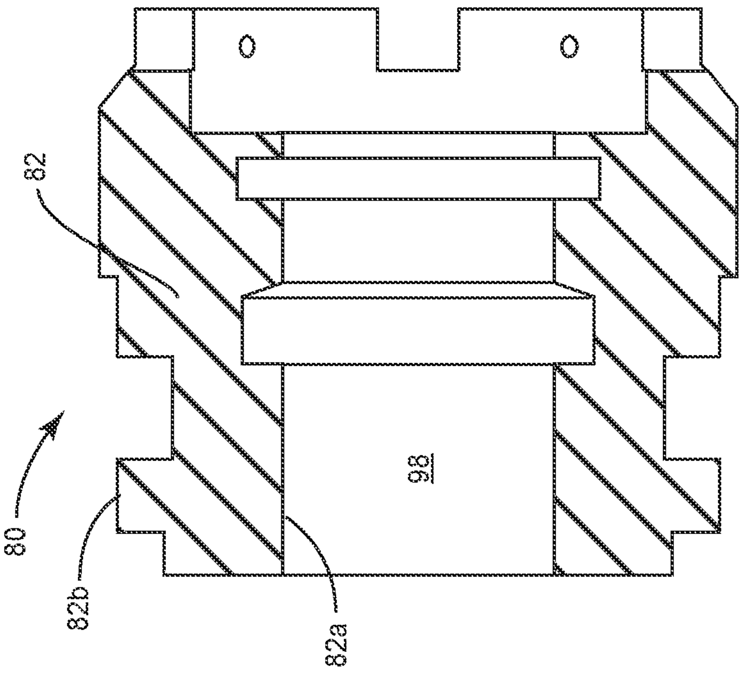
FIG. 4B is a cut-away view illustrating a castle-nut configured without seals according to one aspect of the present disclosure.

As seen in FIGS. 3A-3B, the piston rod 70 moves axially through a central bore 98 (best seen in FIGS. 4A-4B) of castle nut 80 as the piston assembly 130 moves between the extended and retracted positions. Additionally, gaskets 86 and 90 form respective seals to prevent hydraulic fluid from leaking out of chamber 34. In particular, gasket 86 seated in first channel 84 and is configured to form a seal between an exterior wall 82*b* of castle nut 80 and the interior wall 38 of cylinder 30, and prevents the leakage of hydraulic fluid between interior wall 38 and the body 82 of castle nut 80.

Gasket 90 is seated in a second channel 88 and is configured to form a seal between an interior wall 82*a* of castle nut 80 and the piston rod 70, and prevents the leakage of hydraulic fluid between interior wall 82*a* of the castle nut 80 and piston rod 70. The end gland scraper 92 is disposed in a channel formed on the interior wall 82*a* of the castle nut 80, and functions to scrape the piston rod 70 as it moves through the central bore 98 to trap dirt and prevent it from entering chamber 34. The scraper assembly 94 comprises a scraper and a gasket (e.g., another O-ring). The scraper is configured to contact the piston rod 70 as it moves within the central bore 98 and functions to scrape the piston rod 70 as it moves axially through the central bore.

A castle nut 80 configured according to the present aspects provides benefits that conventional castle nuts do not provide. By way of example only, a castle nut 80 configured according to the present aspects is a monolithic member manufactured from titanium. Thus, castle nut 80 comprises fewer component parts than a conventional castle nut. Further, the components parts that are no longer included for castle nut 80 are manufactured from aluminum and aluminum alloys. By eliminating these components, a castle nut 80 configured according to the present disclosure is lighter than a conventional castle nut. Moreover, because the castle nut 80 is monolithic, it is less complex to repair or replace.

Figure 4A:
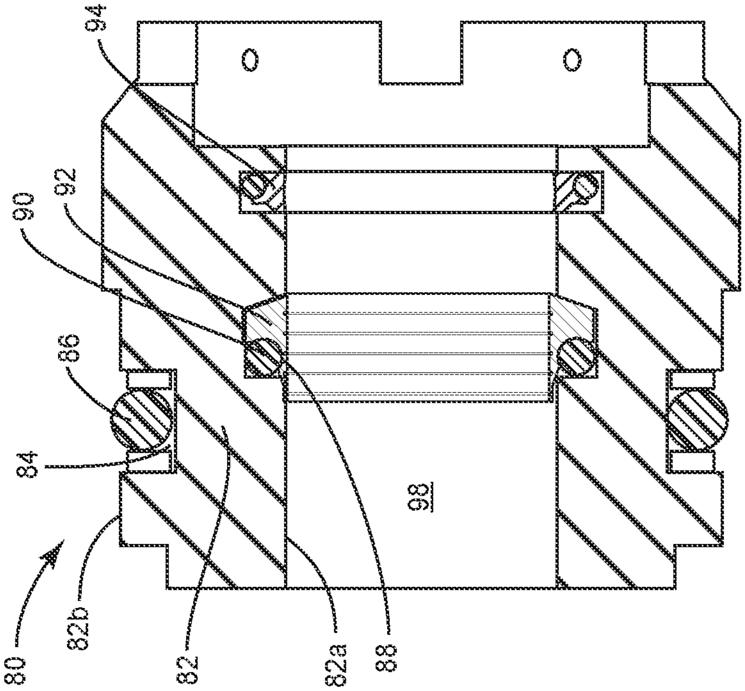
FIG. 4A is a cut-away view illustrating a castle-nut configured with seals according to one aspect of the present disclosure.

FIG. 4A illustrates a larger view of the end gland scraper 92 seen in FIGS. 3A-3B showing the gaskets 86, 90, end gland scraper 92, and scraper assembly 94. As previously described, the first and second channels are sized to receive corresponding first and second gaskets 86, 90. However, those of ordinary skill in the art should appreciate that these components, while useful, may not be included in some examples of actuator 30. For instance, in at least one embodiment, seen in FIG. 4B, the monolithic castle nut 80 does not include the gaskets 86, 90, end gland scraper 92, and scraper assembly 94. By also removing these components, this aspect of the present disclosure may further decrease the costs associated with manufacturing and maintaining such castle nuts 80 and actuators 30, thereby increasing profitability and savings.

Figure 5:
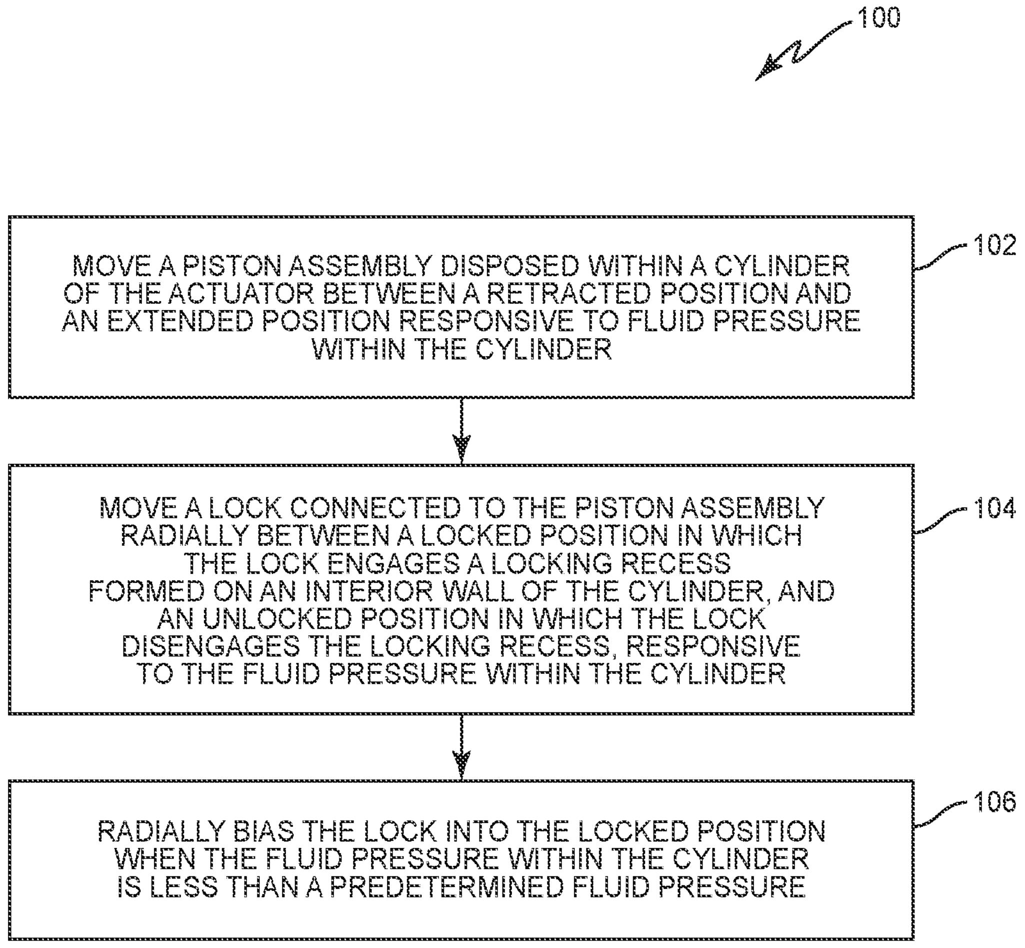
FIG. 5 is a flow chart illustrating a method for operating an actuator according to one aspect of the present disclosure.

FIG. 5 is a flow chart illustrating a method 100 for operating an actuator 30 according to one aspect of the present disclosure. As seen in FIG. 5, method 100 begins with moving the piston assembly 130 within cylinder 32 between the retracted position and the extended position (box 102). As previously described, the movement of the piston assembly 130 is responsive to the pressure of the hydraulic fluid within the cylinder 32. Method 100 then calls for moving lock 60 connected to the piston assembly 130 radially between the locked position, in which the lock 60 engages a locking recess formed on an interior wall 38 of cylinder 32, and an unlocked position, in which lock 60 disengages the locking recess 36 (box 104). As stated above, lock 60 moves radially within a cavity 58 responsive to the fluid pressure within cylinder 32. Method 100 then calls for biasing lock 60 into the locked position when the fluid pressure within the cylinder 32 is less than a predetermined fluid pressure (box 106). In one aspect, the biasing member 61 biases the lock 60 into the locked position when the predetermined fluid pressure at the extension port is less than the biasing force exerted on lock 60 by the biasing member 61.

Figure 6:
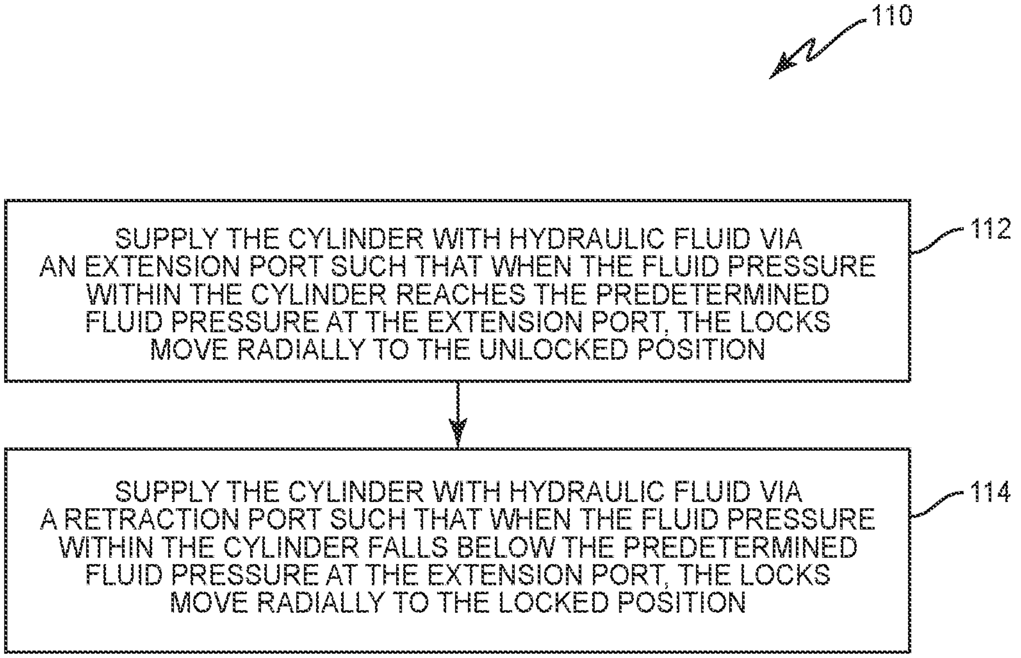
FIG. 6 is a flow chart illustrating a method for moving the locking mechanism of an actuator according to one aspect of the present disclosure.

FIG. 6 is a flow chart illustrating a method 110 for moving the locking mechanism 140 of an actuator 30 according to one aspect of the present disclosure. As seen in FIG. 6, method 110 calls for supplying cylinder 32 with hydraulic fluid via extension port 64 such that when the fluid pressure at extension port 64 reaches the predetermined fluid pressure (e.g., greater than the biasing force exerted on lock 60 by biasing member 61), lock 60 moves radially to the unlocked position (box 112). To move the locking mechanism 140 to the locked position, method 110 calls for supplying cylinder 32 with hydraulic fluid via retraction port 69 such that when the fluid pressure at extension port 64 falls below the predetermined fluid pressure (e.g., is less than the biasing force exerted on lock 60 by biasing member 61), lock 60 moves radially to the locked position (box 114).

Figure 7:
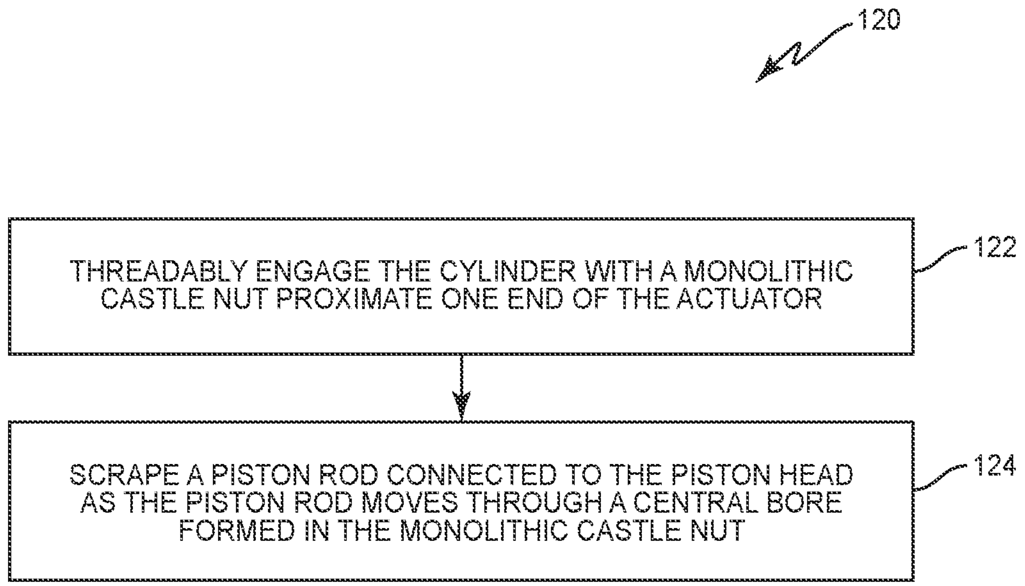
FIG. 7 is a flow chart illustrating a method for operating an actuator with a castle nut configured according to one aspect of the present disclosure.

FIG. 7 is a flow chart illustrating a method 120 for operating an actuator 30 with a monolithic castle nut 80 according to one aspect of the present disclosure. As seen in FIG. 7, method 120 calls for threadably engaging cylinder 32 with the monolithic castle nut 80 proximate one end of an actuator 30 (box 122). In one aspect, castle nut 80 comprises an end gland scraper 92. In these aspects, then, method 120 calls for scraping piston rod 70 as it moves through a central bore 98 formed in the monolithic castle nut 80 (box 124). The end gland scraper 92, as described above, removes dirt from piston rod 70 and traps the dirt thereby preventing it from entering chamber 34.

In the present disclosure, methods 100, 110, and 120 are illustrated and explained as respective figures. However, those of ordinary skill in the art should readily appreciate that this is for illustrative purposes only. In some aspects, method 100 illustrated in FIG. 5 can further include the steps of methods 110 and/or 120 of FIGS. 6 and 7, respectively.

The foregoing description and the accompanying drawings represent non-limiting examples of the methods and apparatus taught herein. For example, the present disclosure describes an actuator 30 in the context of an aircraft 10. However, those of ordinary skill in the art will readily appreciate that this is for illustrative purposes only, and that the aspects described herein are not limited solely to use in aircraft. Rather, the previously described aspects can be implemented on other types of vehicles to achieve the same or similar benefits. Such vehicles include, but are not limited to, manned and unmanned automobiles, manned and unmanned aircraft, manned and unmanned rotorcraft, manned and unmanned rockets and/or missiles, manned and unmanned surface water borne craft, manned and unmanned sub-surface water borne craft, and the like, as well as combinations thereof. As such, the aspects of the present disclosure are not limited by the foregoing description and accompanying drawings. Instead, the aspects of the present disclosure are limited only by the following claims and their legal equivalents.

What is claimed is:

1. An actuator for a flight control member, the actuator comprising:
- a cylinder having a longitudinal axis;
- one or more locking recesses formed on an interior wall of the cylinder;
- a piston assembly disposed within the cylinder and configured to move between a retracted position and an extended position responsive to fluid pressure within the cylinder, the piston assembly comprising:
  - a monolithic piston head comprising:
    - a solid piston body;
    - a piston cap that is spaced apart from, and opposite of, the piston body;
    - a support centrally positioned axially between the piston body and the piston cap;
  - a plurality of cavities formed between the piston cap and the piston body; and a seal disposed between the piston body and the interior wall of the cylinder and configured to prevent fluid from flowing between the piston body and the interior wall of the cylinder; and a piston rod connected to the piston head such that the piston body, the piston cap, and the support are offset from one another and extend along the longitudinal axis of the cylinder; and a locking mechanism connected to the piston assembly, the locking mechanism comprising:

a plurality of locks, each lock configured to move radially within one of the plurality of cavities between a locked position in which the lock engages a corresponding locking recess, and an unlocked position in which the lock disengages the corresponding locking recess, responsive to the fluid pressure within the cylinder; and a plurality of biasing members, wherein each biasing member is disposed within a corresponding cavity between the support and a corresponding lock of the plurality of locks, and is configured to radially bias the corresponding lock into the locked position when the fluid pressure within the cylinder is less than a predetermined fluid pressure.

2. The actuator of claim 1 further comprising:

an extension port through which fluid enters the cylinder to move the plurality of locks radially to the unlocked position; and a retraction port through which the fluid enters the cylinder to move the piston assembly to the retracted position.

3. The actuator of claim 2:

wherein each of the plurality of locks move radially to the unlocked position when the fluid pressure at the extension port is not less than the predetermined fluid pressure; and wherein each of the plurality of locks is biased radially to the locked position when the fluid pressure at the extension port is less than the predetermined fluid pressure.

4. The actuator of claim 1 further comprising a castle nut engaged with the cylinder proximate one end of the actuator, and comprising a central bore configured to receive the piston rod therethrough.

5. The actuator of claim 4 wherein the castle nut is a monolithic member and further comprises a scraper assembly comprising a scraper configured to contact the piston rod as the piston rod moves within the central bore.

6. The actuator of claim 5 wherein the castle nut further comprises one or more channels formed thereon, with each channel sized to receive a corresponding gasket.

7. The actuator of claim 6 wherein the castle nut further comprises:

a first gasket seated in a first channel and configured to form a seal between an exterior wall of the castle nut and an interior wall of the cylinder; and a second gasket seated in a second channel and configured to form a seal between an interior wall of the castle nut and the piston rod.

8. The actuator of claim 1 further comprising:

a first connecting member configured to fixedly attach the actuator to a support structure of an aircraft; and a second connecting member fixedly attached to the piston rod and configured to attach to a flight control member of the aircraft.

9. The actuator of claim 8 wherein the first and second connecting members are disposed at opposite ends of the actuator.

10. The actuator of claim 1 wherein the support extends longitudinally between the piston cap and the solid piston body, and wherein a terminal end of each biasing member is attached to the support.

11. The actuator of claim 1 wherein the piston assembly is configured to move a flight control member of an aircraft when the piston assembly moves between the retracted position and the extended position.

12. A method of operating an actuator for a flight control member, the method comprising:

providing a piston assembly within a cylinder of the actuator, the piston assembly comprising:

a monolithic piston head comprising:

a solid piston body;

a piston cap that is spaced apart from, and opposite of, the piston body;

a support centrally positioned axially between the piston body and the piston cap; and a plurality of cavities formed between the piston cap and the piston body; and a seal disposed between the piston body and an interior wall of the cylinder and configured to prevent fluid from flowing between the piston body and the interior wall of the cylinder; and a piston rod connected to the piston head such that the piston body, the piston cap, and the support are offset from one another and extend along a longitudinal axis of the cylinder; and moving the piston assembly within the cylinder of the actuator between a retracted position and an extended position responsive to fluid pressure within the cylinder;

moving each of a plurality of locks connected to the piston assembly radially within a corresponding cavity between a locked position in which each lock engages a corresponding locking recess formed on an interior wall of the cylinder, and an unlocked position in which each lock disengages the corresponding locking recess, responsive to the fluid pressure within the cylinder;

providing a plurality of biasing members within the piston head, wherein each biasing member is disposed within a corresponding cavity formed in an interior of the piston head between the support and a corresponding lock of the plurality of locks; and radially biasing each of the plurality of locks within the corresponding cavity into the locked position when the fluid pressure within the cylinder is less than a predetermined fluid pressure.

13. The method of claim 12 wherein radially moving the plurality of locks between the locked position and the unlocked position comprises supplying the cylinder with hydraulic fluid via an extension port such that when the fluid pressure at the extension port reaches the predetermined fluid pressure, the plurality of locks move radially to the unlocked position.

14. The method of claim 12 wherein the plurality of locks move radially within the corresponding cavity formed in the interior of the piston head between the locked position and the unlocked position.

15. The method of claim 14 wherein each of the plurality of locks are radially biased within the corresponding cavity towards the corresponding locking recess formed on the interior wall of the cylinder.

16. The method of claim 14 further comprising engaging the cylinder with a monolithic castle nut proximate one end of the actuator.

17. The method of claim 16 further comprising the monolithic castle nut scraping a piston rod connected to the piston head as the piston rod moves through a central bore formed in the monolithic castle nut.

18. A vehicle comprising:

one or more actuators, each actuator comprising:

a cylinder having a longitudinal axis;

one or more locking recesses formed on an interior wall of the cylinder;

a piston assembly disposed within the cylinder and configured to move between a retracted position and an extended position responsive to fluid pressure within the cylinder, the piston assembly comprising:

a monolithic piston head comprising:

a solid piston body;

a piston cap that is spaced apart from, and opposite of, the piston body;

a support centrally positioned axially between the solid piston body and the piston cap;

a plurality of cavities formed between the piston cap and the solid piston body; and a seal disposed between the piston body and the interior wall of the cylinder and configured to prevent fluid from flowing between the piston body and the interior wall of the cylinder;

a piston rod connected to the piston head such that the piston body, the piston cap, and the support extend along the longitudinal axis of the cylinder; and a locking mechanism connected to the piston assembly, the locking mechanism comprising:

a plurality of locks, each lock configured to move radially within one of the plurality of cavities between a locked position in which the lock engages a corresponding locking recess, and an unlocked position in which the lock disengages the corresponding locking recess, responsive to the fluid pressure within the cylinder; and a plurality of biasing members, wherein each biasing member is disposed within a corresponding cavity between the support and a corresponding lock of the plurality of locks, and is configured to radially bias the corresponding lock into the locked position when the fluid pressure within the cylinder is less than a predetermined fluid pressure.

19. The vehicle of claim 18 wherein each actuator further comprises:

an extension port through which fluid enters the cylinder to move the plurality of locks radially to the unlocked position; and a retraction port through which the fluid enters the cylinder to move the piston assembly to the retracted position.

20. The vehicle of claim 18 wherein the vehicle is an aircraft, and wherein at least one of the one or more actuators is disposed on a flight control member of the aircraft.

* * * * *